(12) United States Patent
Koo et al.

(10) Patent No.: US 8,401,480 B2
(45) Date of Patent: Mar. 19, 2013

(54) METHOD FOR PERFORMING COMP OPERATION AND TRANSMITTING FEEDBACK INFORMATION IN A WIRELESS COMMUNICATION SYSTEM

(75) Inventors: Ja Ho Koo, Anyang-si (KR); Jian Xu, Anyang-si (KR); Bin Chul Ihm, Anyang-si (KR); Jae Hoon Chung, Anyang-si (KR); Hyun Soo Ko, Anyang-si (KR); Moon Il Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 408 days.

(21) Appl. No.: 12/717,623

(22) Filed: Mar. 4, 2010

(65) Prior Publication Data

US 2010/0273514 A1 Oct. 28, 2010

Related U.S. Application Data

(60) Provisional application No. 61/157,212, filed on Mar. 4, 2009, provisional application No. 61/169,706, filed on Apr. 15, 2009, provisional application No. 61/178,487, filed on May 14, 2009, provisional application No. 61/246,503, filed on Sep. 28, 2009.

(30) Foreign Application Priority Data

Dec. 28, 2009 (KR) .......................... 10-2009-0131658

(51) Int. Cl.
*H04B 1/00* (2006.01)
(52) U.S. Cl. .................... 455/63.1; 455/114.2; 455/303; 375/267; 375/347

(58) Field of Classification Search .............. 455/63.1, 455/114.2, 296, 303, 306, 423, 501, 562.1; 375/267, 299, 347; 370/328–338
See application file for complete search history.

(56) References Cited

U.S. PATENT DOCUMENTS

| 8,010,147 | B2* | 8/2011 | Kaminski et al. | 455/522 |
| 2007/0082620 | A1* | 4/2007 | Zhang et al. | 455/69 |
| 2007/0165738 | A1 | 7/2007 | Barriac et al. | |
| 2007/0174038 | A1 | 7/2007 | Wang et al. | |
| 2010/0091893 | A1* | 4/2010 | Gorokhov | 375/260 |

OTHER PUBLICATIONS

R. Vodafone et al., "Multisite Field Trial for LTE and Advanced Concepts", IEEE Communications Magazine, Feb. 2009, pp. 92-98.
M. Karakayali, et al., "Network Coordinated Spectrally Efficient Communications in Cellular Systems", IEEE Wireless Communications, Aug. 2006, 56-61.

* cited by examiner

*Primary Examiner* — Dominic E Rego
(74) *Attorney, Agent, or Firm* — McKenna Long & Aldridge LLP (57) ABSTRACT

A method for performing a Coordinated Multi-Point (CoMP) operation and transmitting feedback information in a wireless communication system is disclosed. The method includes measuring interference levels or noise and interference variances of reference signals received from one or more neighbor cells, and transmitting to a serving Base Station (BS) information about the measured interference levels or noise and interference variances, and information about a Precoding Matrix Index (PMI) that a mobile station (MS) wants to restrict or recommend for a neighbor cell performing the CoMP operation.

13 Claims, 4 Drawing Sheets

METHOD FOR PERFORMING COMP OPERATION AND TRANSMITTING FEEDBACK INFORMATION IN A WIRELESS COMMUNICATION SYSTEM

CROSS REFERENCE TO RELATED APPLICATIONS

This application claims the benefit of U.S. Provisional Application Nos. 61/157,212 filed on Mar. 4, 2009; 61/169,706 filed on Apr. 15, 2009; 61/178,487 filed on May 14, 2009; 61/246,503 filed on Sep. 28, 2009, which are hereby incorporated by reference as if fully set forth herein.

This application claims the benefit of Korean Patent Application No. 10-2009-0131658, filed on Dec. 28, 2009, which is hereby incorporated by reference as if fully set forth herein.

TECHNICAL FIELD

The present invention relates to a wireless communication system, and more particularly, to a method for performing a Coordinated Multi-Point (CoMP) operation in a wireless communication system.

BACKGROUND ART

A CoMP system was designed to apply advanced Multiple Input Multiple Output (MIMO) to a multi-cell environment, with the goal of improving the throughput of users at a cell edge. The use of the CoMP system may reduce inter-cell interference in the multi-cell environment. In this CoMP system, multi-cell Base Stations (BSs) may support joint data transmission to a User Equipment (UE).

Each BS may support one or more UEs, UE 1 to UE K simultaneously using the same radio frequency resources, thus increasing system performance. Also, the BS may operate in Space Division Multiple Access (SDMA) based on Channel State Information (CSI) between the BS and the UEs.

There are two types of CoMP schemes: Joint Processing (JP) based on data sharing and Coordinated Scheduling/Beamforming (CS/CB).

Figure 1:
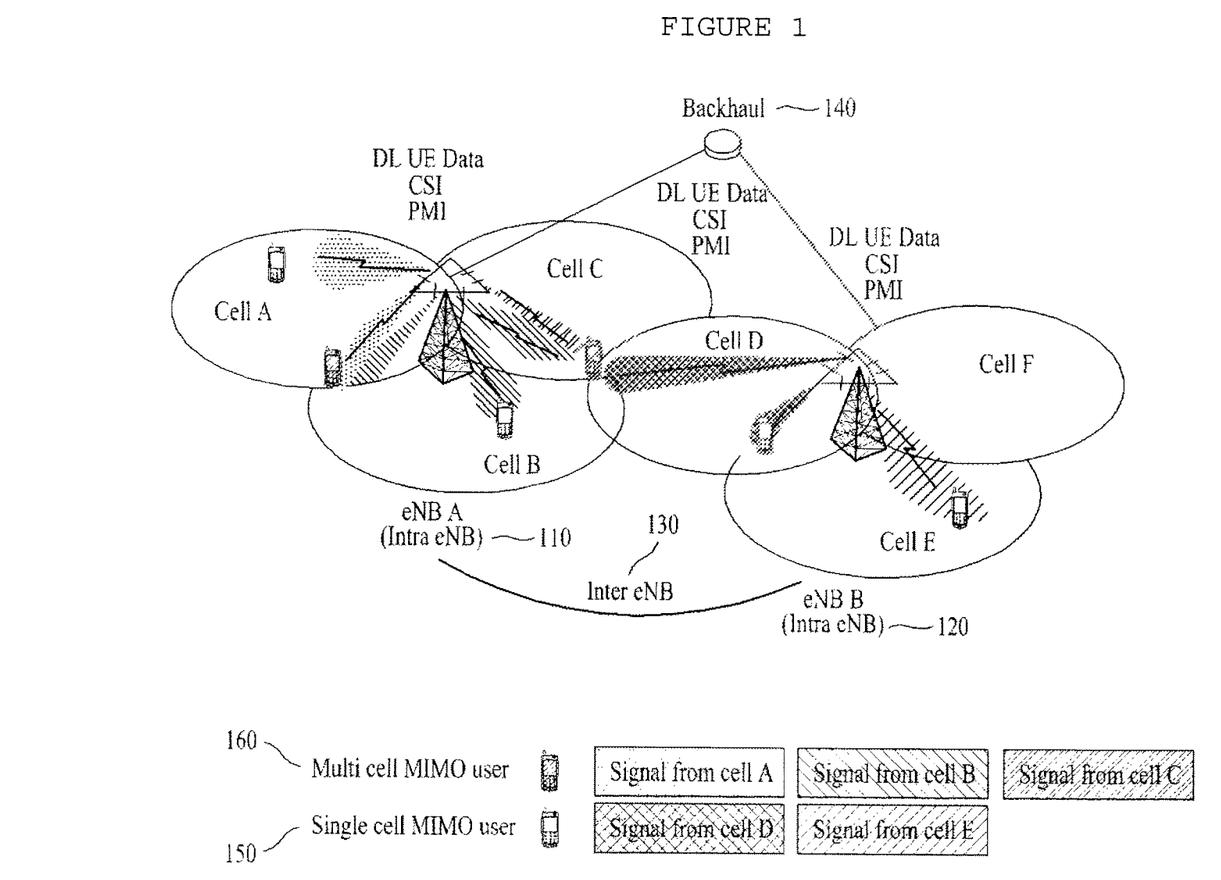
FIG. 1 illustrates the concept of intra-evolved Node B (intra-eNB) CoMP and inter-eNB CoMP.

FIG. 1 illustrates the concept of intra-evolved Node B (intra-eNB) CoMP and inter-eNB CoMP.

Referring to FIG. 1, there are intra-eNBs 110 and 120 and an inter-eNB 130 in a multi-cell environment. In Long Term Evolution (LTE), an intra-eNB covers a plurality of cells or sectors. Cells covered by an eNB to which a UE belongs to are in an intra-eNB relationship with the UE. In other words, cells under the same eNB managing the cell of a UE are intra-eNB cells, whereas cells under a different eNB from the eNB of the UE are inter-eNB cells. Cells within the same eNB exchange information (e.g. data and CSI) with each other via x2 interfaces or the like. Cells in different eNBs exchange information through a backhaul 140.

As illustrated in FIG. 1, a single-cell MIMO user 150 in a single cell or sector may communicate with a serving eNB in the cell or sector, and a multi-cell MIMO user 160 at a cell edge may communicate with a plurality of serving eNBs in multiple cells or sectors.

A brief description will be made of a spatial channel matrix that may be used as feedback information.

A spatial channel matrix H(i,k) may be given as $$H(i,k) = \begin{bmatrix} h_{1,1}(i,k) & h_{2,1}(i,k) & \cdots & h_{1,Nt}(i,k) \\ h_{2,1}(i,k) & h_{2,2}(i,k) & \cdots & h_{2,Nt}(i,k) \\ \vdots & \vdots & \ddots & \vdots \\ h_{Nr,1}(i,k) & h_{Nr,2}(i,k) & \cdots & h_{Nr,Nt}(i,k) \end{bmatrix}$$

where $h_{r,t}(i,k)$ denotes an element of the spatial channel matrix H(i,k), Nr denotes the number of Reception (Rx) antennas, Nt denotes the number of Transmission (Tx) antennas, r denotes the index of an Rx antenna, t denotes the index of a Tx antenna, i denotes the index of an Orthogonal Frequency Division Multiplexing (OFDM) or Single Carrier-Orthogonal Frequency Division Multiplexing (SC-OFDM) symbol, and k denotes the index of a subcarrier.

An element of the spatial channel matrix H(i,k) $h_{r,t}(i,k)$ represents the channel status between an $r^{th}$ Rx antenna and a $t^{th}$ Tx antenna.

A spatial channel covariance matrix R that is applicable to the present invention may be expressed as $R=E[H_{i,k}H_{i,k}{}^{H}]$ where H denotes the spatial channel matrix, E[ ] denotes a mean, i denotes a symbol index, and k denotes a subcarrier index.

Singular Value Decomposition (SVD) is one of significant factorizations of a rectangular matrix, with many applications in signal processing and statistics. The SVD is a generalization of the spectral theorem of matrices to arbitrary rectangular matrices. The spectral theorem says that an orthogonal square matrix can be unitarily diagonalized using a base of eigenvalues. Let the channel matrix H be an m×m matrix having real or complex entries. Then the channel matrix H may be expressed as the product of the following three matrices.

$$H_{m \times m} = U_{m \times m} \Sigma_{m \times n} V_{m \times n}{}^{H}$$

where U and V are unitary matrices and Σ is an m×n diagonal matrix with non-negative singular values. For the singular values, $\Sigma = \text{diag}(\sigma_1 \ldots \sigma_r)$, $\sigma_i = \sqrt{\lambda_i}$. This factorization into the product of three matrices is called SVD. The SVD is very general in the sense that it can be applied to any matrices whereas EigenValue Decomposition (EVD) can be applied only to orthogonal square matrices. Nevertheless, the two decompositions are related.

If the channel matrix H is a positive, definite Hermitian matrix, all eigenvalues of the channel matrix H are non-negative real numbers. The singular values and singular vectors of the channel matrix H are its eigenvalues and eigenvectors.

The EVD may be expressed as $$HH^{H} = (U\Sigma V^{H})(U\Sigma V^{H})^{H} = U\Sigma\Sigma^{T}U^{H}$$

$$H^{H}H = (U\Sigma V^{H})^{H}(U\Sigma V^{H}) = V\Sigma^{T}\Sigma V$$

where the eigenvalues may be $\lambda_1 \ldots \lambda_r$.

Conventionally, MSs transmit only Precoding Matrix Indexes (PMIs) as feedback information to an eNB, thus making it difficult for the eNB to prioritize the PMIs. Consequently, a CoMP operation suffers from decreased efficiency and accuracy due to the difficulty in ranking PMIs.

DISCLOSURE

Technical Problem

An object of the present invention devised to solve the problem lies on a method for performing a CoMP operation and a method for transmitting CoMP feedback information in a wireless communication system.

Another object of the present invention devised to solve the problem lies on a MS apparatus for performing a CoMP operation and transmitting CoMP feedback information in a wireless communication system.

A further object of the present invention devised to solve the problem lies on a BS apparatus and MS apparatus for performing a CoMP operation in a wireless communication system.

It will be appreciated by persons skilled in the art that the objects that could be achieved with the present invention are not limited to what has been particularly described hereinabove and the above and other objects that the present invention could achieve will be more clearly understood from the following detailed description taken in conjunction with the accompanying drawings.

Technical Solution

The object of the present invention can be achieved by providing a method for transmitting CoMP feedback information in a MS in a wireless communication system that one or more base station performs a CoMP operation, includes transmitting PMI (Precoding Matrix Index) set information that the MS want to restrict or recommend for specific neighbor cell performing the CoMP operation to a serving base Station (BS); and transmitting a signal strength gain value or a interference level gain value corresponding to difference value between a signal strength or a interference level calculated the PMI set is applied to the specific neighbor cell and a signal strength or a interference level calculated the PMI set is applied to the specific neighbor cell to the serving BS.

The object of the present invention can be achieved by providing a method for transmitting CoMP feedback information in a MS in a wireless communication system that one or more base station performs a CoMP operation, includes measuring noise and interference variances corresponding to a signal strength or a interference level using reference signals received from one or more neighbor cells; and transmitting to a serving Base Station (BS) noise and interference variance information including the measured noise and interference variances and information about a Precoding Matrix Index (PMI) that the MS wants to restrict or recommend for a specific neighbor cell performing the CoMP operation.

In a another aspect of the present invention, provided herein is a MS apparatus in a wireless communication system that performs a CoMP operation, includes a measurement module for measuring noise and interference variance value including a signal strength or interference level using a reference signals received from one or more neighbor cells; and a transmission module for transmitting to a serving Base Station (BS) noise and interference variance information including the measured noise and interference variance value, and information about Precoding Matrix Indexes (PMIs) that the MS wants to restrict or recommend for a specific neighbor cell performing the CoMP operation.

Advantageous Effects

According to the present invention, a UE and a BS can perform a CoMP operation more efficiently.

It will be appreciated by persons skilled in the art that the effects that could be achieved with the present invention are not limited to what has been particularly described hereinabove and the above and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

In the drawings.

BEST MODE

Reference will now be made in detail to the exemplary embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details. For example, the following detailed description is given under the assumption that a mobile communication system is a $3^{rd}$ Generation Partnership Project Long Term Evolution (3GPP LTE) system. However, the description is applicable to any other mobile communication system except for specific features of the 3GPP LTE system.

In some instances, known structures and devices are omitted, or are shown in a block diagram form focusing on important features of the structures and devices, so as not to obscure the concept of the present invention. The same reference numbers will be used throughout this specification to refer to the same or like parts.

In the following description, 'Mobile Station (MS)' is assumed to refer to a mobile or fixed user end device such as a User Equipment (UE), and 'Base Station (BS)' is assumed to refer to any node of a network end, such as a Node B and an evolved Node B (eNB or eNode B), communicating with the MS.

In a mobile communication system, a MS may receive information from a BS on a downlink and the MS may transmit information to the BS on an uplink. Information transmitted or received by the MS includes data and control information. There are various physical channels according to types and purposes of information transmitted or received by the MS.

Figure 2:
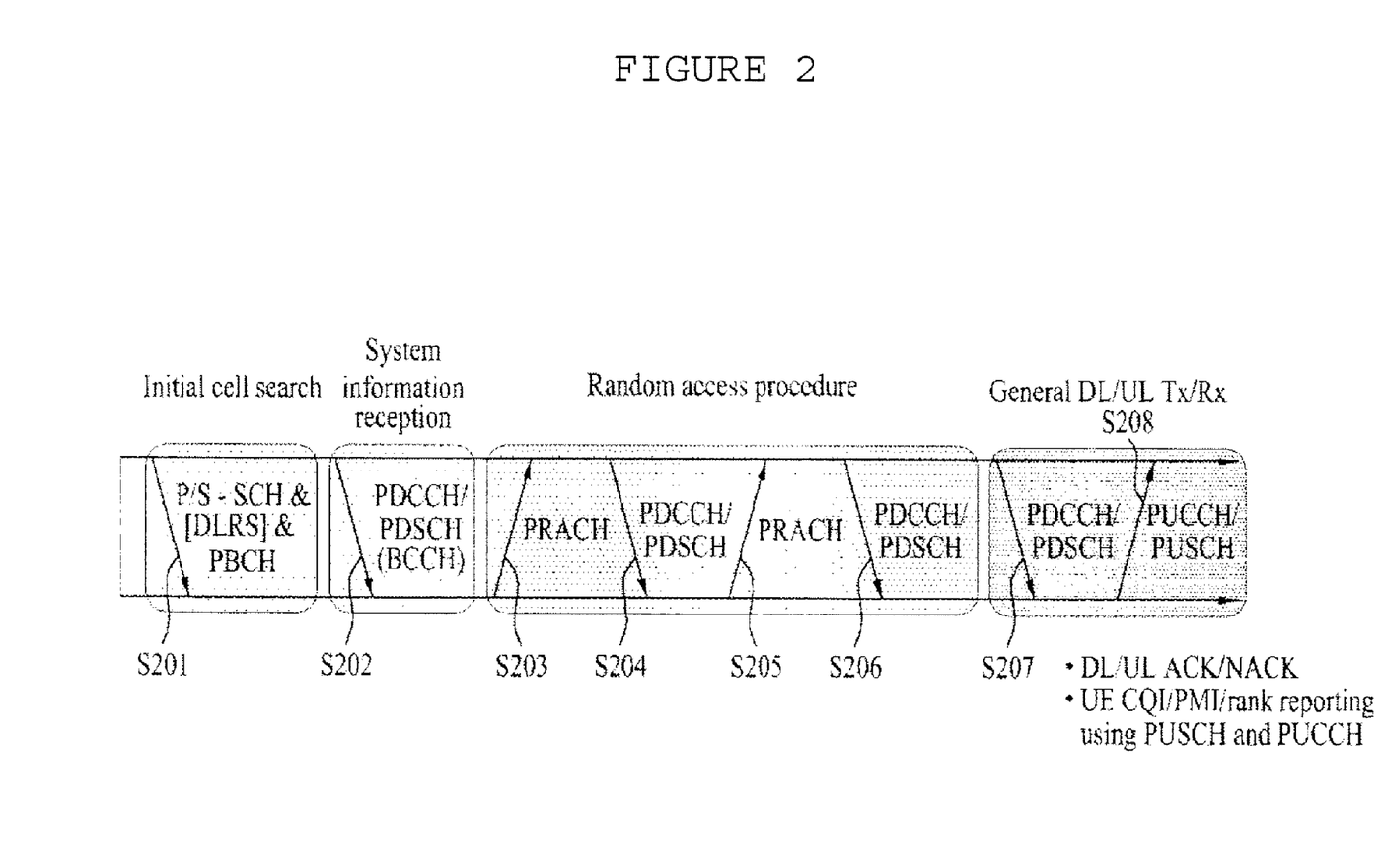
FIG. 2 illustrates physical channels used in a mobile communication system, for example, a $3^{rd}$ Generation Partnership Project (3GPP) Long Term Evolution (LTE) system and a general signal transmission method using the physical channels.

FIG. 2 illustrates physical channels used in a mobile communication system, for example, a 3GPP LTE system and a general signal transmission method using the physical channels.

Referring to FIG. 2, upon power-on or when a MS initially enters a cell, the MS performs an initial cell search involving synchronization of its timing to an eNB in step S201. For the initial cell search, the MS may be synchronized to the eNB and acquire information such as a cell Identifier (ID) by receiving a Primary Synchronization CHannel (P-SCH) and a Secondary Synchronization CHannel (S-SCH). Then the MS may receive broadcast information from the cell on a Physical Broadcast CHannel (PBCH). In the mean time, the MS may determine a downlink channel status by receiving a DownLink Reference Signal (DL RS) during the initial cell search.

After the initial cell search, the MS may acquire more specific system information by receiving a Physical Downlink Control CHannel (PDCCH) and receiving a Physical Downlink Shared CHannel (PDSCH) based on information of the PDCCH in step S202.

On the other hand, if the MS initially accesses the eNB or if the MS does not have radio resources for signal transmission, it may perform a random access procedure to the eNB in steps S203 to S206. For the random access, the MS may transmit a predetermined sequence as a preamble to the eNB on a Physical Random Access CHannel (PRACH) in step S203 and receive a response message for the random access on a PDCCH and a PDSCH corresponding to the PDCCH in step S204. In the case of contention-based random access other than handover, the MS may perform a contention resolution procedure by further transmitting the PRACH in step S205 and receiving a PDCCH and its related PDSCH in step S206.

After the foregoing procedure, the MS may receive a PDCCH and a PDSCH in step S207 and transmit a Physical Uplink Shared CHannel (PUSCH) and a Physical Uplink Control CHannel (PUCCH) in step S208, as a general downlink/uplink signal transmission procedure. Here, uplink control information transmitted from the MS to the BS or downlink control information transmitted from the MS to the BS may include a downlink or uplink ACKnowledgement/Negative ACKnowledgment (ACK/NACK) signal, a Channel Quality Indicator (CQI), a Precoding Matrix Index (PMI) and/or a Rank Indicator (RI). The MS adapted to operate in the 3GPP LTE system may transmit the control information such as a CQI, a PMI, and/or an RI on the PUSCH and/or the PUCCH.

The term used herein "eNB" is interchangeable with "cell" or "sector", when it is used in a geographical sense. A serving eNB (or cell) may be regarded as an eNB (or cell) that provides a main service to MSs and transmit and receive control information in a Coordinated Multi-Point (CoMP) scheme. In this context, a serving eNB (cell) is referred to as an anchor eNB (or cell). The serving eNB may transmit information received from a neighbor eNB (or cell). The term "neighbor eNB" may also be referred to as "neighbor cell", if it is used in a geographical sense. A CoMP set refers to a set of cells that can perform a CoMP operation.

The use of CoMP in a multi-cell environment brings improvement in the communication performance of a MS at a cell edge. CoMP schemes are classified into a coordinated Multiple Input Multiple Output (MIMO) technique based data sharing, called Joint Processing (JP), and Coordinated Scheduling/Beamforming (CS/CB) seeking to reduce inter-cell interference, such as worst companion or best companion. According to the worst companion scheme, a MS reports PMIs causing the worst interference, namely worst-companion PMIs for cells that carry out a CoMP operation (hereinafter, referred to as CoMP cells) to a serving eNB, so that the cells use sub-optimal PMIs except for the worst-interfering PMIs. Thus, inter-cell interference is reduced. In contrast, the best companion scheme reduces inter-cell interference by reporting PMIs causing the least interference, namely best-companion PMIs for the CoMP cells to the serving eNB by the MS such that the CoMP cells use the best-companion PMIs.

For efficient implementation of the CoMP schemes, there exists a need for defining measurement information including interference levels (or signal strengths) of neighbor cells measured by a MS and feedback information transmitted to an eNB by the MS. As a measurement procedure of the MS and an overall operation procedure associated with a CoMP active set are specified, an efficient CoMP operation can be performed. The CoMP active set is a set of transmission points that serve a specific MS and carry out actual CoMP transmission.

In case of a CoMP scheme, CS/CB, the MS may transmit to the serving eNB information about PMIs that it wants to restrict and/or recommend for neighbor cells operating in CoMP (shortly, CoMP neighbor cells). When a plurality of MSs operate in CoMP, PMIs that they may want to restrict and/or recommend for CoMP neighbor cells may increase in number. Then it is preferable that the CoMP neighbor cells select restricted and/or recommended PMIs from among the restricted and/or recommended PMIs received from the MSs. Accordingly, concerning the MSs' requests for restriction and/or recommendation of the PMIs, the CoMP neighbor cells may prioritize the restricted and/or recommended PMIs. However, it is not preferable to rank the restricted and/or recommended PMIs only based on the PMI information received from the MSs.

In this context, the present invention provides methods for enabling a CoMP neighbor cell to efficiently prioritize PMIs. One of the methods is that besides PMI information, the MS transmits additional information to the serving eNB. The additional information may be transmitted in such an occasion as 1) when a CoMP set is configured and 2) when PMI information is transmitted during a CoMP operation.

A method for transmitting additional information from a MS when a CoMP set is configured will first be described below.

The CoMP set may be configured based on measurement information including interference levels (or signal levels) of neighbor cells by a MS, etc. Since the CoMP set is configured with neighbor cells that directly affect the MS, the CoMP set configuration is flexible. The MS may refer to a neighbor cell list in measuring the interference levels of the neighbor cells, etc. The neighbor list may be received beforehand from the serving BS, for use in configuring the CoMP set. Alternatively, the MS may make the neighbor cell list autonomously by measuring the neighbor cells.

The measurement information about the interference levels of the neighbor cells measured for configuring the CoMP set by the MS may be represented as various types of values. The representation types include Reference Signal Received Power (RSRP), Reference Signal Received Quality (RSRQ), Reference Signal Strength Indicator (RSSI), Propagation Delay (PD), Carrier-to-Interference and Noise Ratio (CINR) or Signal-to-Interference and Noise Ratio (SINR) of a neighbor cell using a good PMI or a bad PMI, CINR or SINR improvement of a serving cell indicating to what extent the channel status of the serving cell is improved, determined by comparing a CINR or SINR of the serving cell measured when a neighbor cell uses a good PMI or does not use a bad PMI with a previous CINR or SINR measurement of the serving cell, etc. Among them, CINR or SINR improvement values may help a neighbor cell to rank PMIs. The MS may generate a value corresponding to the difference between the CINR or SINR of the serving cell measured when the neighbor cell uses a MS-recommended good PMI or it does not use a MS-restricted bad PMI and the CINR or SINR of the serving cell before the neighbor cell applies the MS-recommended or MS-restricted PMI and transmit the value to the serving eNB. Upon receipt of the information from the serving eNB, the neighbor cell may be aware how much the channel status of the serving eNB is improved from the CINR or SINR difference and thus easily prioritize PMIs.

In this manner, a MS may measure the channel quality status between the MS and a cell using a CINR or SINR improvement value corresponding to a pilot power level, an RSRP, etc. in the LTE system. The RSRP is the linear average of power allocated to resource elements to which a cell-specific reference signal is mapped in a predetermined frequency bandwidth for measurement. The power of each resource element in a resource block may be determined according to the reception energy of a valid symbol period except a Cyclic Prefix (CP). The RSRP may apply to the MS in both RRC_idle state and RRC_connected state. If the MS operates in a reception diversity scheme, the reported RSRP value is the linear average of the power values of diversity branches.

In addition to information about PMIs that the MS wants to restrict and/or recommend for neighbor cells, the MS may transmit the above-described other various types of measurements to the serving eNB. Meanwhile, the MS may transmit the various types of measurements to the serving eNB, even during a CoMP operation. Specifically, the MS may measure the interference levels of CoMP neighbor cells, etc. again during the CoMP operation and transmit the additional various types of measurements to the serving eNB.

Based on the measurements of its neighbor cells (e.g. RSRPs, etc.), the MS may report information required for configuring the CoMP set to the serving eNB. The reported information may include the cell IDs of the neighbor cells along with one or more of the foregoing measurements of the neighbor cells. In the case where the MS makes a neighbor cell list autonomously, it may directly transmit the cell IDs of the measured neighbor cells to the serving eNB.

On the other hand, if the serving eNB has transmitted the neighbor cell list to the MS, the MS may transmit the RSRPs of the neighbor cells in a predetermined order of cell IDs or further transmit the cell IDs of the neighbor cells together with the measurements to the serving eNB. It may be further contemplated that the MS arranges indexes corresponding to the cell IDs in the order of interference levels and transmits the indexes along with the interference level measurements mapped to the indexes to the serving eNB.

The serving eNB may receive from MSs information about PMIs that the MSs want to restrict and/or recommend PMIs for CoMP neighbor cells and information about the interference levels of the CoMP neighbor cells. Then the serving eNB may transmit the received PMI information and interference level information to the CoMP neighbor cells. Each CoMP neighbor cell may determine restricted and/or recommended PMIs based on the PMI information and interference level information and prioritize the PMIs. The CoMP neighbor cell may determine the restricted and/or recommended PMIs only by PMI counting without the interference level information. To be more specific, the CoMP neighbor cell may rank PMIs based on the counts of the PMIs for restriction and/or recommendation. However, when a small number of MSs are involved in the CoMP operation or the restriction and/or recommendation counts are equal across the PMIs, the CoMP neighbor cell may not prioritize the PMIs. Nonetheless, the CoMP neighbor cell may determine a PMI requested most for recommendation and/or restriction. Consequently, the overhead resulting from transmitting additional feedback information from the MS to the eNB may be reduced.

The case where PMI information and additional information are transmitted during a CoMP operation will be described below.

When a CoMP operation is performed with a CoMP set configured or a CoMP operation is performed without configuring the CoMP set, the MS may select restricted and/or recommended PMIs for interfering neighbor cells and transmit the selected PMIs to the serving eNB. When the MS transmits PMIs to the serving eNB in order to perform the CS/CB scheme during the CoMP operation, the serving eNB may use interference level information received from the MS during configuring the CoMP set so that CoMP neighbor cells prioritize PMIs. Specifically, if the interference level information measured for the neighbor cells during the CoMP set configuration is used, the MS may transmit only the PMI information for the neighbor cells to the serving eNB during the CoMP operation. Therefore, PMIs are prioritized with less feedback overhead.

Meanwhile, the MS may transmit interference level information along with PMI information for CoMP neighbor cells during a CoMP operation. Interference level information reported for configuring a CoMP set (initial related information in a CoMP system that does not configure a CoMP set) may not reflect time-varying interference levels. Accordingly, the MS transmits the PMI information and the interference level information together. The PMI information and the interference level information may be transmitted in the same or different transmission periods.

The additional interference level information may be expressed as various types of measurement values like values measured about neighbor cells by the MS during configuring the CoMP set. As stated before, the representation types include RSRP, RSRQ, RSSI, PD, CINR or SINR measured for a neighbor cell using a good PMI or a bad PMI, CINR or SINR improvement of a serving cell indicating to what extent the channel status of the serving cell is improved, determined by comparing a CINR or SINR of the serving cell measured when a neighbor cell uses a good PMI or does not use a bad PMI with a previous CINR or SINR measurement of the serving cell, etc. Among them, CINR or SINR improvement values may help a neighbor cell to rank PMIs. The MS may generate a value corresponding to the difference between a CINR or SINR measured when the neighbor cell uses a MS-recommended good PMI or it does not use a MS-restricted bad PMI and a CINR or SINR before the neighbor cell applies the MS-recommended or MS-restricted PMI and transmit the value to the serving eNB. Upon receipt of the information from the serving eNB, the neighbor cell may be aware how much the channel status of the serving eNB is improved from the CINR or SINR difference and thus easily prioritize PMIs. In this manner, the MS may measure the difference between the interference level of the serving cell when a neighbor cell applies a PMI set notified to it and the interference level of the serving cell when the neighbor cell does not apply the PMI set.

Aside from the methods for transmitting PMI information and interference level information from the MS during a CoMP operation, a method for transmitting PMI information and noise and interference variance information may be contemplated. To help a CoMP neighbor cell to prioritize PMIs, the MS further transmits noise and interference variance information in addition to PMI information. Thus the CoMP neighbor cell may efficiently select restricted and/or recommended PMIs and further prioritize them.

Hereinbelow, a description will be made of a method for transmitting PMI information and noise and interference variance information to a serving eNB by a MS, as a feedback transmission scheme. First, feedback information to be measured and transmitted by the MS will be defined.

$W_S$ denotes a MS-selected PMI for a serving cell, $\sigma_S^2$ denotes the noise and interference variance of the serving cell measured by the MS ($\sigma_S^2$ may be the signal strength of the serving cell measured by the MS), $W_{N_1}^2, \ldots, \sigma_{N_n}^2$ denote PMIs that the MS wants to restrict and/or recommend for CoMP neighbor cells, $\sigma_v^2$ denotes the noise and interference variances of the remaining non-CoMP cells, $\sigma_{N_1}^2, \ldots, \sigma_{N_n}^2$ denote the noise and interference variances of the CoMP neighbor cells (the signal strengths or interference strengths of the CoMP neighbor cells) when restricted and/or recommended PMIs are applied to the CoMP neighbor cells, $\Delta\sigma_{N_1}^2, \ldots, \Delta\sigma_{N_n}^2$ denote the differences between the noise and interference variances of the CoMP neighbor cells when the restricted and/or recommended PMIs are applied to them and the noise and interference variances of the CoMP neighbor cells when the restricted and/or recommended PMIs are not applied to them, namely the variations of the CoMP neighbor cells in noise and interference variance (the variations of the CoMP neighbor cells in signal strength or interference strength), $\sigma_{N_{b1}}^2, \ldots, \sigma_{N_{bm}}^2$ denote the noise and interference variances of the CoMP neighbor cells when the restricted PMIs are applied to them, $\sigma_{N_{g1}}^2, \ldots, \sigma_{N_{gn}}^2$ denote the noise and interference variances of the CoMP neighbor cells when the recommended PMIs are applied to them, $\Delta\sigma_{N_{b1}}^2, \ldots, \Delta\sigma_{N_{bm}}^2$ denote the differences between the noise and interference variances of the CoMP neighbor cells when the restricted PMIs are applied to them and the noise and interference variances of the CoMP neighbor cells when the restricted PMIs are not applied to them (the variations of the CoMP neighbor cells in noise and interference variance), $\Delta\sigma_{N_{g1}}^2, \ldots, \Delta\sigma_{N_{gn}}^2$ denote the differences between the noise and interference variances of the CoMP neighbor cells when the recommended PMIs are applied to them and the noise and interference variances of the CoMP neighbor cells when the recommended PMIs are not applied to them (the variations of the CoMP neighbor cells in noise and interference variance), $\sigma_{N_{w_1}}^2, \ldots, \sigma_{N_{w_n}}^2$ denote the noise and interference variances of the entire cells that the MS can measure when the restricted and/or recommended PMIs are applied to the respective CoMP neighbor cells, and $\Delta\sigma_{N_{w_1}}^2, \ldots, \Delta\sigma_{N_{w_n}}^2$ denote the differences between the noise and interference variances of the entire cells that the MS can measure when the restricted and/or recommended PMIs are applied to the CoMP neighbor cells and the noise and interference variances of the entire cells that the MS can measure when the restricted and/or recommended PMIs are not applied to the CoMP neighbor cells.

Exemplary feedback information transmission schemes that are classified according to the types of noise and interference variance values transmitted from the MS to the serving eNB will be described in more detail.

One of the feedback information transmission schemes, i.e. one of the noise and interference variance information transmission schemes is that a MS at a cell edge may transmit to a serving eNB the noise and interference variances about the remaining non-CoMP cells, $\sigma_v^2$ in addition to MS-requested restricted and/or recommended PMIs for CoMP neighbor cells.

Another noise and interference variance information transmission scheme is that the MS may transmit to the serving eNB the noise and interference variances of the CoMP neighbor cells when the restricted or recommended PMIs are applied to them, $\sigma_N^2$ in addition to the restricted and/or recommended PMIs for the CoMP neighbor cells and the noise and interference variances of the remaining non-CoMP cells, $\sigma_v^2$. N represents the index of an interfering cell among the CoMP neighbor cells and $\sigma_N^2$ represents the noise and interference variance of a specific CoMP neighbor cell. The expression of $\Delta\sigma_N^2$ can be derived from $\sigma_N^2$, which indicates the difference between the noise and interference variance of the CoMP neighbor cell when a restricted or recommended PMI is applied to the CoMP neighbor cell and the noise and interference variance of the CoMP neighbor cell when the restricted or recommended PMI is not applied to the CoMP neighbor cell. In summary, the MS may transmit the restricted and/or recommend PMIs, $\sigma_v^2$ and $\sigma_N^2$ (or $\Delta\sigma_N^2$) to the serving eNB or all of the restricted and/or recommend PMIs, $\sigma_v^2$, $\sigma_N^2$, and $\Delta\sigma_N^2$ to the serving eNB.

In a third noise and interference variance information transmission scheme, the MS may transmit to the serving eNB the noise and interference variances of the CoMP neighbor cells when the restricted PMIs are applied to them, $\sigma_{N_b}^2$ and the noise and interference variances $\sigma_{N_g}^2$ of the CoMP neighbor cells when the recommended PMIs are applied to them, in addition to the restricted and/or recommended PMIs for the CoMP neighbor cells and the noise and interference variances of the remaining non-CoMP cells, $\sigma_v^2$. Instead of $\sigma_{N_b}^2$ and $\sigma_{N_g}^2$, the MS may transmit the difference between $\sigma_{N_b}^2$ and $\sigma_{N_g}^2$, $\Delta\sigma_{N_{bg}}^2$ to the serving eNB. Or the MS may transmit all of the restricted and/or recommended PMIs, $\sigma_v^2$, $\sigma_{N_b}^2$, $\sigma_{N_g}^2$, and $\Delta\sigma_{N_{bg}}^2$ to the serving eNB.

In a fourth noise and interference variance information transmission scheme, in addition to the restricted and/or recommended PMIs for the CoMP neighbor cells and the noise and interference variances of the remaining non-CoMP cells, $\sigma_v^2$, the MS may transmit to the serving eNB the noise and interference variances of the entire cells when the restricted or recommended PMIs are applied to the respective CoMP neighbor cells, $\sigma_{Nw}^2$ or the differences between $\sigma_{Nw}^2$ and the noise and interference variances of the entire cells before the restricted or recommended PMIs are applied to the respective CoMP neighbor cells, $\Delta\sigma_{Nw}^2$. In other words, the MS may further transmit $\sigma_{Nw}^2$ or $\Delta\sigma_{Nw}^2$. $\Delta\sigma_{Nw}^2$ represents a variation in the noise and interference variance of the entire cells that affect the MS, not the noise and interference variance of a specific CoMP neighbor cell alone.

It may be further contemplated as a fifth noise and interference variance information transmission scheme that, in addition to the restricted and/or recommended PMIs for the CoMP neighbor cells, the noise and interference variance of the serving cell, $\sigma_S^2$, the noise and interference variances of the remaining non-CoMP cells, $\sigma_v^2$, the MS may transmit $\sigma_N^2$ to the serving eNB. Or the MS may transmit the restricted and/or recommended PMIs for the CoMP neighbor cells, and CINR values $$\frac{\sigma_S^2}{\sigma_v^2} \text{ and } \frac{\sigma_S^2}{\sigma_N^2}$$

to the serving eNB. Upon receipt of the PMIs and the CINR values $$\frac{\sigma_S^2}{\sigma_v^2} \text{ and } \frac{\sigma_S^2}{\sigma_N^2},$$

the serving eNB may calculate CINRs $$\frac{\sigma_S^2}{\sigma_v^2 + \sigma_N^2}$$

based on the received information, in case of CS/CB. In case of JP, the serving eNB may calculate CINRs $$\frac{\sigma_S^2 + \sigma_N^2}{\sigma_v^2}.$$

According to this transmission scheme, the MS may transmit a reduced amount of feedback information to the serving eNB. Also, the MS may transmit CINRs to the serving eNB using the differences $\Delta\sigma_N^2$ between the noise and interference variances of the CoMP neighbor cells in case of applying the restricted and/or recommended PMIs to them and the noise and interference variances of the CoMP neighbor cells in case of not applying the restricted and/or recommended PMIs to them. To be more specific, the MS may transmit the restricted and/or recommended PMIs, $$\frac{\sigma_S^2}{\sigma_v^2} \text{ and } \frac{\sigma_S^2}{\Delta\sigma_N^2}$$

to the serving eNB. Or the MS may transmit the restricted and/or recommended PMIs, $$\frac{\sigma_S^2}{\sigma_v^2}, \frac{\sigma_S^2}{\sigma_N^2} \text{ and } \frac{\sigma_S^2}{\Delta\sigma_N^2}$$

to the serving eNB.

In a sixth noise and interference variance information transmission scheme, the MS may further transmit information about the CoMP neighbor cells based on CQIs $$\frac{\sigma_S^2}{\sigma_v^2 + \sigma_{N_1}^2 \ldots \sigma_{N_n}^2}$$

that is transmitted from the MS to the serving eNB in case of a single-cell operation. That is, the MS may further transmit interference level information about the CoMP neighbor cells to the serving eNB. When the MS measures the signal strengths of the multiple cells, it may have difficulty in measuring the noise and interference variances of the non-CoMP neighbor cells, $\sigma_v^2$ due to overhead or any other factor. Then during a multi-cell CoMP operation, the MS may still feed back values which were measured for feedback information transmission during the single-cell operation. The extension of the single-cell feedback information to the multi-cell feedback information leads to a more efficient transmission of feedback information. Consequently, the overhead of measuring the interference levels of CoMP neighbor cells and transmitting feedback information in the multi-cell environment can be reduced considerably.

For example, the MS may transmit the signal strengths of the CoMP neighbor cells normalized with the signal strength of the serving cell, $$\frac{\sigma_N^2}{\sigma_S^2}$$

in addition to the single cell-based CQI of the serving cell $$\frac{\sigma_S^2}{\sigma_v^2 + \sigma_{N_1}^2 \ldots \sigma_{N_n}^2}.$$

JP (Joint Processing) as well as Cs/CB may perform well by use of these values.

As described above, the method of transmitting noise and interference variance information is an exemplary. The MS may feed back to serving BS in various combination types of measured channel state information such as this noise and interference variance information.

Table 1 below lists exemplary values measured about neighbor cells by a MS.

TABLE 1

| | Measurements of serving cell | Measurements of CoMP neighbor cells | Measurement of remaining non-CoMP cells |
|---|---|---|---|
| Option 1 | $W_S$<br>$\sigma_S^2$ (optional) | $W_{N_1}, \ldots, W_{N_n}$ | $\sigma_v^2$ |
| Option 2-1 | $W_S$<br>$\sigma_S^2$ (optional) | $W_{N_1}, \ldots, W_{N_n}$<br>$\sigma_{N_1}^2, \ldots, \sigma_{N_n}^2$ or<br>$\Delta\sigma_{N_1}^2, \ldots, \Delta\sigma_{N_n}^2$ | $\sigma_v^2$ |
| Option 2-2 | $W_S$<br>$\sigma_S^2$ (optional) | $W_{N_1}, \ldots, W_{N_n}$<br>$\sigma_{N_1}^2, \ldots, \sigma_{N_n}^2$ and<br>$\Delta\sigma_{N_1}^2, \ldots, \Delta\sigma_{N_n}^2$ | $\sigma_v^2$ |
| Option 3-1 | $W_S$<br>$\sigma_S^2$ (optional) | $W_{N_1}, \ldots, W_{N_n}$<br>$(\sigma_{N_{b1}}^2, \ldots, \sigma_{N_{bm}}^2 \sigma_{N_{g1}}^2, \ldots, \sigma_{N_{gn}}^2)$ or<br>$(\Delta\sigma_{N_{b1}}^2, \ldots, \Delta\sigma_{N_{bm}}^2 \Delta\sigma_{N_{g1}}^2, \ldots, \Delta\sigma_{N_{gn}}^2)$ | $\sigma_v^2$ |
| Option 3-2 | $W_S$<br>$\sigma_S^2$ (optional) | $W_{N_1}, \ldots, W_{N_n}$<br>$(\sigma_{N_{b1}}^2, \ldots, \sigma_{N_{bm}}^2 \sigma_{N_{g1}}^2, \ldots, \sigma_{N_{gn}}^2)$ and<br>$(\Delta\sigma_{N_{b1}}^2, \ldots, \Delta\sigma_{N_{bm}}^2 \Delta\sigma_{N_{g1}}^2, \ldots, \Delta\sigma_{N_{gn}}^2)$ | $\sigma_v^2$ |
| Option 4-1 | $W_S$<br>$\sigma_S^2$ (optional)<br>$\sigma_{N_{w_1}}^2, \ldots, \sigma_{N_{w_n}}^2$ or $\Delta\sigma_{N_{w_1}}^2, \ldots, \Delta\sigma_{N_{w_n}}^2$ | $W_{N_1}, \ldots, W_{N_n}$ | $\sigma_v^2$ |
| Option 4-2 | $W_S$<br>$\sigma_S^2$ (optional)<br>$\sigma_{N_{w_1}}^2, \ldots, \sigma_{N_{w_n}}^2$ and $\Delta\sigma_{N_{w_1}}^2, \ldots, \Delta\sigma_{N_{w_n}}^2$ | $W_{N_1}, \ldots, W_{N_n}$ | $\sigma_v^2$ |

TABLE 1-continued

| | Measurements of serving cell | Measurements of CoMP neighbor cells | Measurement of remaining non-CoMP cells |
|---|---|---|---|
| Option 5-1 | $W_S$ $\dfrac{\sigma_S^2}{\sigma_v^2}$ | $W_{N_1}, \ldots, W_{N_n}$ $\dfrac{\sigma_S^2}{\sigma_{N_1}^2}, \ldots, \dfrac{\sigma_S^2}{\sigma_{N_n}^2}$ and $\Delta\dfrac{\sigma_S^2}{\sigma_{N_1}^2}, \ldots, \Delta\dfrac{\sigma_S^2}{\sigma_{N_n}^2}$ | |
| Option 5-2 | $W_S$ $\dfrac{\sigma_S^2}{\sigma_v^2}$ | $W_{N_1}, \ldots, W_{N_n}$ $\dfrac{\sigma_S^2}{\sigma_{N_1}^2}, \ldots, \dfrac{\sigma_S^2}{\sigma_{N_n}^2}$ and $\Delta\dfrac{\sigma_S^2}{\sigma_{N_1}^2}, \ldots, \Delta\dfrac{\sigma_S^2}{\sigma_{N_n}^2}$ | $\sigma_v^2$ |
| Option 6 | $W_S$ $\dfrac{\sigma_S^2}{\sigma_v^2 + \sigma_{N_1}^2 \ldots \sigma_{N_n}^2}$ | $W_{N_1}, \ldots, W_{N_n}$ $\dfrac{\sigma_{N_1}^2}{\sigma_S^2}, \ldots, \dfrac{\sigma_{N_n}^2}{\sigma_S^2}$ | |

The table 1 shows an exemplary of transmission of measured information. The MS may feed back measured value to serving BS in various combination types.

Figure 3:
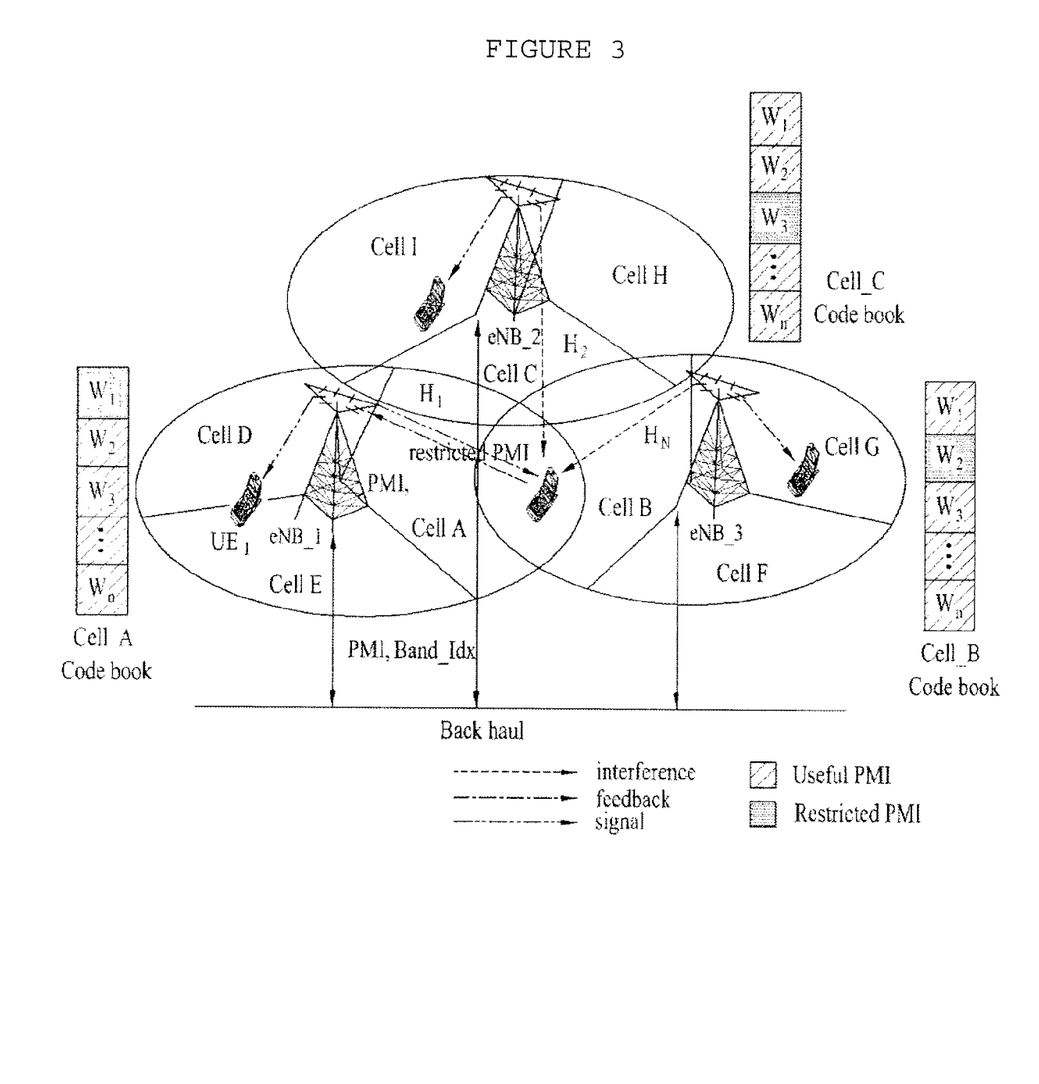
FIG. 3 illustrates the concept of a Coordinated Multi-Point (CoMP) operation between a User Equipment (UE) an evolved Node B (eNB) according to the present invention.

FIG. 3 illustrates the concept of a CoMP operation between a MS and an BS according to the present invention.

In the illustrated case of FIG. 3, there are a total of nine neighbor cells Cell A to Cell I for a MS at a cell edge. Among them, three neighbor cells Cell A, Cell B and Cell C are involved in CS/CB or PMI restriction and/or recommendation. A MS at a cell edge served by Cell A is interfered from Cell B and Cell C and wants to restrict PMIs $W_2$ and $W_3$ for cell B and Cell C, respectively among available PMIs. The noise and interference variances of the remaining six non-CoMP cells Cell D to Cell I are denoted by $\sigma_v^2$. When transmitting the MS-requested restricted PMI $W_2$ for Cell B, the MS may further transmit the noise and interference variance $\sigma_{N_2}^2$ of Cell B measured in the case where Cell B is restricted in its use of PMI $W_2$. Alternatively, the MS may further transmit the difference $\Delta\sigma_{N_2}^2$ between the noise and interference variance of Cell B measured in the case of restricting use of PMI $W_2$ in Cell B and the noise and interference variance of Cell B measured in the case of not restricting use of PMI $W_2$ in Cell B. Let the noise and interference variance of Cell B in the case of applying the restricted PMI be denoted by $\sigma_{N_{b2}}^2$ and the noise and interference variance of Cell B in the case of applying a recommended PMI be denoted by $\sigma_{N_{g2}}^2$. Then the difference between $\sigma_{N_{b2}}^2$ and $\sigma_{N_{g2}}^2$ may be represented as $\Delta\sigma_{N_{bg2}}^2$. A variation in the noise and interference variance of the entire cells Cell A to Cell I in the case of applying the restricted or recommended PMI to Cell B may be denoted by $\Delta\sigma_{Nw_2}^2$.

The MS may transmit these various types of measurements with the PMI information in various combinations to the serving eNB. For instance, the MS may transmit the restricted PMI for Cell B, $W_2$ and the noise and interference variances of the remaining non-CoMP cells, $\sigma_v^2$. In addition to $W_2$ and $\sigma_v^2$, the MS may further transmit to the serving eNB the noise and interference variance of Cell B, $\sigma_{N_2}^2$ in case of restricting the PMI $W_2$ in Cell B and/or a variation in the PMI restriction-based noise and interference variance, $\Delta\sigma_{N_2}^2$. In another approach, the MS may transmit the restricted PMI for Cell B, $W_2$, $\sigma_v^2$ and at least one of $\sigma_{N_{b2}}^2$, $\sigma_{N_{g2}}^2$, $\Delta\sigma_{N_{bg2}}^2$ and $\Delta\sigma_{Nw_2}^2$ to the serving eNB.

Concerning Cell C, similarly, the MS may the restricted PMI for Cell C, $W_3$ and the noise and interference variances of the remaining non-CoMP cells, $\sigma_v^2$. In addition to $W_3$ and $\sigma_v^2$, the MS may further transmit to the serving eNB the noise and interference variance of Cell B, $\sigma_{N_3}^2$ in case of restricting the PMI $W_3$ in Cell C and/or a variation in the noise and interference variance of Cell C according to the use and non-use of the PMI $W_3$, $\Delta\sigma_{N_3}^2$. In another approach, the MS may transmit the restricted PMI for Cell C, $W_3$, $\sigma_v^2$ and at least one of $\sigma_{N_{b3}}^2$, $\sigma_{N_{g3}}^2$, $\Delta\sigma_{N_{bg3}}^2$ and $\Delta\sigma_{Nw_3}^2$ to the serving eNB.

Upon receipt of the above-described information, the serving eNB may calculate the differences in CINR, ΔCINR between application of the restricted and/or recommended PMIs to the CoMP neighbor cells and non-application of the restricted and/or recommended PMIs to the CoMP neighbor cells, to thereby enable PMI prioritization and efficient CS/CB.

When transmitting CSI feedback information to the serving eNB, the MS may normalize the CSI feedback information for transmission.

The MS may report CSIs other than recommended transmission properties (e.g. CQI, PMI, and RI) to the serving eNB. In general, quantization CSI feedback and analog CSI feedback are available as CSI feedback schemes. Irrespective of these CSI feedback types, the MS may include a spatial channel matrix H or a spatial channel covariance matrix R in a CSI reported to the serving cell. Specifically, the MS may transmit the spatial channel matrix H or the spatial channel covariance matrix R as CSI feedback information and additionally noise variance information (e.g. interference levels) to the serving eNB. That is, the MS may transmit noise and interference variance information along with the spatial channel matrix H or the spatial channel covariance matrix R to the serving eNB.

To transmit the CSI more accurately and more efficiently, the MS may normalize the CSI. The normalization may be carried out on an element basis or on a column vector basis of the spatial channel matrix H and/or the spatial channel covariance matrix R.

The column-based vector normalization will be described below.

The vector normalization may be performed using the maximum of the norms of the columns of the matrix. Besides the channel matrix H and/or the covariance matrix R, the noise and interference variances may be normalized with the column having the maximum norm. After the normalization, each column may be transmitted in two ways.

One is to transmit the weight factor of the norm of each normalized column together with the CSI feedback information to the serving eNB. The serving eNB and the MS share a codebook with a norm (e.g. norm=1). The serving eNB may acquire phase information from the channel matrix H and/or the covariance matrix R received from the MS and determine the magnitude of each column on a constellation according to the weighting factor of the norm of the column. The unique value of the weighting factor may be transmitted as it is or in the form of a quantized value. Also, only the variation of the weight factor with respect to a weighting factor of 1 may be transmitted.

The other way is that the serving eNB and the MS have codebooks corresponding to a plurality of norms and the serving eNB may acquire phase information and on-constellation magnitude information from the channel matrix H and/or the covariance matrix R received from the MS. Estimation accuracy increases with the number of pre-defined codebooks.

Now a method for transmitting a normalized channel matrix H and/or covariance matrix R from the MS will be described, taking an example. In a 4×4 MIMO system with four Tx antennas of an eNB and four Rx antennas of a MS, the MS may transmit the following 4×4 channel matrix H to the serving eNB.

[Equation 1]

$$H = \begin{bmatrix} \overset{|v_1|}{\begin{pmatrix} h_{1,1} \\ h_{2,1} \\ h_{3,1} \\ h_{4,1} \end{pmatrix}} & \overset{|v_2|}{\begin{pmatrix} h_{1,2} \\ h_{2,2} \\ h_{3,2} \\ h_{4,2} \end{pmatrix}} & \overset{|v_3|}{\begin{pmatrix} h_{1,3} \\ h_{2,3} \\ h_{3,3} \\ h_{4,3} \end{pmatrix}} & \overset{|v_4|}{\begin{pmatrix} h_{1,4} \\ h_{2,4} \\ h_{3,4} \\ h_{4,4} \end{pmatrix}} \end{bmatrix}$$

On the assumption that the norms of the columns are $|v_1|=2, |v_2|=1, |v_3|=1$, and $|v_4|=0.5$, the channel matrix H may be normalized with the maximum of the norms, i.e. the norm of the first column. The resulting normalized norms of the columns are 1, 0.5, 0.5, and 0.25, respectively and the MS may transmit the weighting vectors of non-one norms to the serving eNB.

Aside from the transmission of weighting factors to the serving eNB, the MS may notify the serving eNB of channel matrix values by mapping them to values in codebooks shared between the serving eNB and the MS. For example, there are four codebooks for predetermined norms, $codebook_{norm=1}=\{w_1, \ldots, w_n\}$, $codebook_{norm=0.75}=\{w'_1, \ldots, w'_n\}$, $codebook_{norm=0.5}=\{w''_1, \ldots, w''_n\}$, and $codebook_{norm=0.25}=\{w'''_1, \ldots, w'''_n\}$. The channel matrix H is first normalized with the maximum of the norms of the columns. In the example given as Equation 1, the normalized norm of the first column is mapped to one of the values $codebook_{norm=1}=\{w_1, \ldots, w_n\}$, the normalized norm of the second column is mapped to one of the values $codebook_{norm=0.75}=\{w'_1, \ldots, w'_n\}$, the normalized norm of the third column is mapped to one of the values $codebook_{norm=0.5}=\{w''_1, \ldots, w''_n\}$, and the normalized norm of the fourth column is mapped to one of the values $codebook_{norm=0.25}=\{w'''_1, \ldots, w'''_n\}$. After the mapping, the MS may feed back the indexes corresponding to the mapped values to the serving eNB.

The present invention may be extended to transmission of the channel matrices H or covariance matrices R of a plurality of eNBs and noise and interference variances of other eNBs. In this case, normalization may be performed using the maximum of the columns of all channel matrices or covariance matrices.

Figure 4:
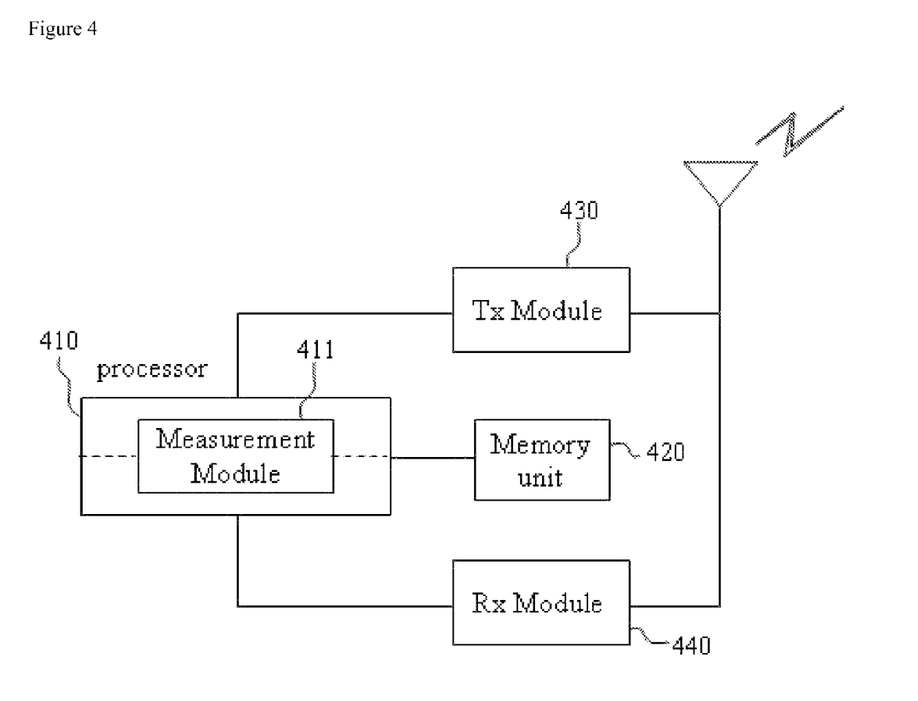
FIG. 4 is a block diagram illustrating the configuration of a UE apparatus according to an exemplary embodiment of the present invention.

FIG. 4 is a block diagram of a MS apparatus according to an exemplary embodiment of the present invention.

Referring to FIG. 4, a CoMP-enabled MS apparatus in a wireless communication system includes a processor 410, a memory unit 420, a Tx module 430, and an Rx module 440.

The processor 410 includes a measurement module 411. The measurement module 411 may measure the interference levels or noise and interference variances of reference signals from one or more neighbor cells.

The memory unit 420 may store information received from an eNB and the measurements generated from the measurement module 411 for a predetermined time period. The memory unit 420 may be replaced with another element such as a buffer (not shown).

The Tx module 430 may transmit information about the interference levels or noise and interference variances measured by the measurement module 411 and information about restricted and/or recommended PMIs for specific neighbor cells to the serving eNB.

The Rx module 440 may receive control information, data, and like that.

MODE FOR INVENTION

Various embodiments have been described in the best mode for carrying out the invention.

INDUSTRIAL APPLICABILITY

The method for performing a CoMP operation and transmitting feedback information according to the present invention is applicable to a variety of wireless communication systems.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The invention claimed is:

1. A method for transmitting feedback information at a mobile station (MS) in a wireless communication system that performs a Coordinated Multi-Point (CoMP) operation, the method comprising:
   measuring noise and interference variances corresponding to a signal strength or a interference level using reference signals received from one or more neighbor cells; and
   transmitting to a serving Base Station (BS) noise and interference variance information including the measured noise and interference variances and information about a Precoding Matrix Index (PMI) that the MS wants to restrict or recommend for a specific neighbor cell performing the CoMP operation.

2. The method according to claim 1, wherein the noise and interference variance information includes a first noise and interference variance information corresponding to difference value between a noise and interference variance value calculated when the restricted or recommended PMI is applied to the specific neighbor cell performing the CoMP operation and a noise and interference variance value calculated when the restricted or recommended PMI is not applied to the specific neighbor cell performing the CoMP operation.

3. The method according to claim 1, wherein the noise and interference variance information includes a second noise and interference variance for one or more cells that does not perform the CoMP operation.

4. The method according to claim 3, wherein the noise and interference variance information further includes a third noise and interference variance information corresponding to value calculated in a case where the restricted or recommended PMI is applied to the specific neighbor cell performing the CoMP operation.

5. The method according to claim 3, wherein the noise and interference variance information further includes a fourth noise and interference variance information corresponding to a difference value between a noise and interference variance value calculated in a case where the restricted or recommended PMI is applied to the specific neighbor cell performing the CoMP operation and a noise and interference variance value calculated in a case where the restricted or recommended PMI is not applied to the specific neighbor cell performing the CoMP operation.

6. The method according to claim 3, wherein the noise and interference variance information further includes a fifth noise and interference variance information corresponding to a noise and interference variance value calculated in a case where the restricted PMI is applied to the specific neighbor cell performing the CoMP operation and a noise and interference variance value calculated in a case where the recommended PMI is applied to the specific neighbor cell performing the CoMP operation.

7. The method according to claim 3, wherein the noise and interference variance information further includes a sixth noise and interference variance information including a value corresponding to a difference between a noise and interference variance value calculated in a case where the restricted PMI is applied to the specific neighbor cell performing the CoMP operation and a noise and interference variance value calculated in a case where the recommended PMI is applied to the specific neighbor cell performing the CoMP operation.

8. The method according to claim 3, wherein the noise and interference variance information further includes a seventh noise and interference variance information corresponding to a noise and interference variance value calculated in a case where the restricted or recommended PMI is applied to entire cells performing the CoMP operation.

9. The method according to claim 3, wherein the noise and interference variance information further includes a eighth noise and interference variance information corresponding to a difference value between a noise and interference variance value calculated in a case where the restricted or recommended PMI is applied to entire cells performing the CoMP operation and a noise and interference variance value calculated before the restricted or recommended PMI is applied to the entire cells operating the CoMP operation.

10. The method according to claim 3, wherein the noise and interference variance information further includes information about a noise and interference variance value of a serving cell.

11. The method according to claim 10, wherein the noise and interference variance information further includes information about a value represented using a noise and variance value of the serving cell and one of a noise and interference variance value of one or more cells that does not perform the CoMP operation and a noise and interference variance value calculated in a case where the restricted or recommended PMI is applied to the specific neighbor cell performing the CoMP operation.

12. The method according to claim 10, wherein the noise and interference variance information further includes information about a value represented using a noise and variance value of the serving cell, and one of a noise and interference variance value of one or more cells that does not perform the CoMP operation and a difference between a noise and variance value calculated in a case where the restricted or recommended PMI is applied to the specific neighbor cell performing the CoMP operation and a noise and variance value calculated before the restricted or recommended PMI is applied to the specific neighbor cell performing the CoMP operation.

13. A mobile station (MS) apparatus in a wireless communication system that performs a Coordinated Multi-Point (CoMP) operation, the MS apparatus comprising:
a measurement module for measuring noise and interference variance value including a signal strength or interference level using a reference signals received from one or more neighbor cells; and
a transmission module for transmitting to a serving Base Station (BS) noise and interference variance information including the measured noise and interference variance value, and information about Precoding Matrix Indexes (PMIs) that the MS wants to restrict or recommend for a specific neighbor cell performing the CoMP operation.

* * * * *